United States Patent [19]

LaPour et al.

[11] 4,043,260
[45] Aug. 23, 1977

[54] OPEN-FIRE ROTISSERIE STAND

[76] Inventors: Robert H. LaPour, 6000 5-Mile Road, Racine, Wis. 53402; Harold G. Liefbroer, 4717 Graceland Blvd., Racine, Wis. 53406

[21] Appl. No.: 695,015

[22] Filed: June 11, 1976

[51] Int. Cl.[2] .............................................. A47J 37/04
[52] U.S. Cl. ........................ 99/421 HH; 99/421 HV; 126/30
[58] Field of Search .......... 99/421 HH, 421 HV, 339, 99/340; 126/25 A, 30

[56] References Cited

U.S. PATENT DOCUMENTS

| 447,373 | 3/1891 | Smith | 126/25 A |
|---|---|---|---|
| 1,853,319 | 4/1932 | Polhemus | 126/25 A X |
| 2,213,483 | 9/1940 | Benson | 126/25 A X |
| 2,691,368 | 10/1954 | Hood | 126/25 A |
| 2,827,846 | 3/1958 | Karkling | 99/339 |
| 3,943,837 | 3/1976 | Trkla | 99/339 |

Primary Examiner—Philip R. Coe
Attorney, Agent, or Firm—Axel H. Johnson

[57] ABSTRACT

A means to support a rotisserie over an outdoor open fire; the rotisserie being hung from a frame by a chain. An adjusting means is provided to raise or lower the rotisserie relative to the fire, proportional to the heat required. Levelling means is included in order to adjust the level of the rotisserie so as to obtain uniform roasting of the meat mounted thereon. The frame can be disassembled for transportation.

2 Claims, 3 Drawing Figures 4,043,260

OPEN-FIRE ROTISSERIE STAND

BACKGROUND OF THE INVENTION

1. Field of the Invention

This invention relates to a rotisserie-supporting frame that permits positioning the rotisserie over an open fire while roasting fowl or other meat.

2. Description of the Prior Art

The prior art embraces rotisseries of various types; some being supported in various manners over open fires or confined within an oven.

SUMMARY OF THE INVENTION

This invention, generally, concerns a rotisserie-supporting means for use outdoors over an open fire. The rotisserie is hung from a frame and is supported therefrom by a flexible member such as a link chain. The hanging means permits the rotisserie to be raised or lowered relative to the fire and to be leveled when necessary in order to assure uniform roasting of the meat suspended thereon.

An object of this invention is to provide a means to support a rotisserie over an open fire, which means has provision for adjusting the height of the unit relative to the fire, and to level it for uniform roasting of the meat. Another object is to provide a rotisserie supporting means that can be disassembled for transportation.

Referring to the drawings.

Referring again to the drawings; the frame 10 comprises a horizontal cylindrical bar 12 which terminates at the ends thereof in downwardly-diverging stub portions 14. Downwardly-diverging tubular legs 18 receive the portions 14 in assembly, and which construction permits disassembly of the frame for transportation.

Figure 1:
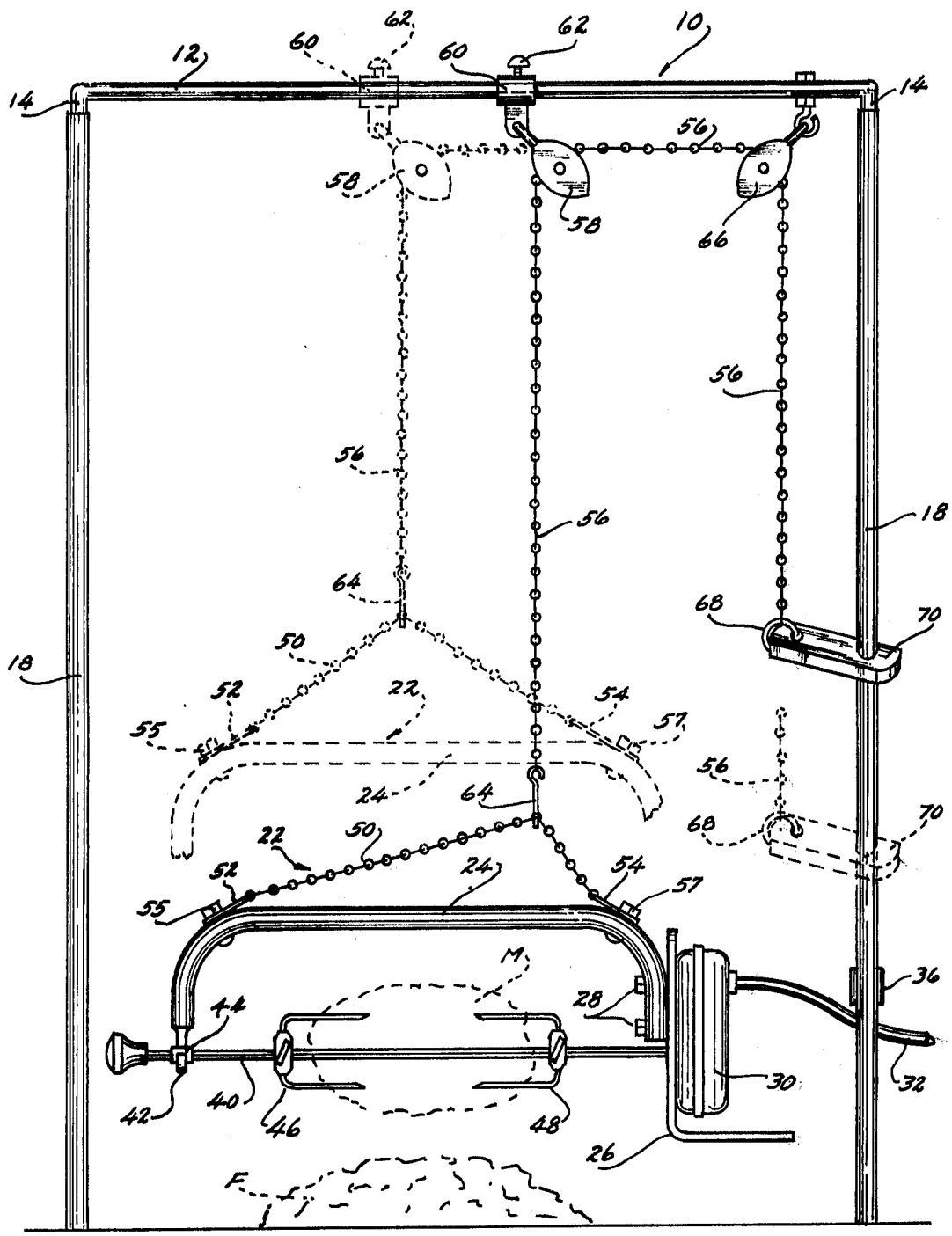
FIG. 1 is an upright side view showing the rotisserie hanging from the frame and positioned above a fire.

The rotisserie 22 comprises a tubular beam member 24 of the shape shown in FIG. 1. A heat shield 26 is secured integrally to beam member 24 by bolts or other suitable fastening means 28. A motor 30 is also secured to the beam on the opposed side of the heat shield by suitable means, and a power cord 32 is provided to be connected to a suitable power outlet by means of the plug 34. Cord 32 is supported above the ground by a hook member 36 which is slidable on the leg 18 and secured in position by a screw member 38.

The square rotisserie shaft 40 is supported at one end thereof in a hook 42 which is integral with beam 24. Shaft 40 is provided with a cylindrical portion 44 which is supported for rotation in hook 42. The opposed end of shaft 40 is engaged to be rotated by the motor 30. Meat-support forks 46 and 48 are of the conventional type and need not be further described and which are employed to support the meat or fowl M to be roasted.

Rotisserie unit 22 is provided with a flexible bail 50 which, in this instance, comprises a suitable link chain. Bail 50 is secured at the ends thereof to beam 24 by means of clips 52 and 54 which are secured to beam 24 by bolts 55 and 57. Bail 50 is of a length to provide a substantial loop between clips 52 and 54 as shown in FIG. 1.

The rotisserie-suspension member 56 is a suitable link chain which extends vertically and passes over a first pulley 58, which pulley is supported from bar 12 by means of an anchor member 60 which is shiftable axially along bar 12 and secured in place by thumb-screw member 62. A hook 64 is secured to the end of chain 56 and is of a shape to engage a selective link of chain bail 50. The link that is selected being one that assures that shaft 40 will be positioned substantially level as shown in FIG. 1 after meat to be roasted is placed thereon. Chain 56 passes horizontally from a pulley 58, to a second pulley 66 and then downwardly to terminate in a ring 68. A height-adjusting arm 70 fits freely over a leg portion 18 as shown in enlarged detail in FIG. 3, and frictionally engages leg 18 at the desired position. Ring 68 is linked through a suitable aperture in arm 70.

Figures 2, 3:
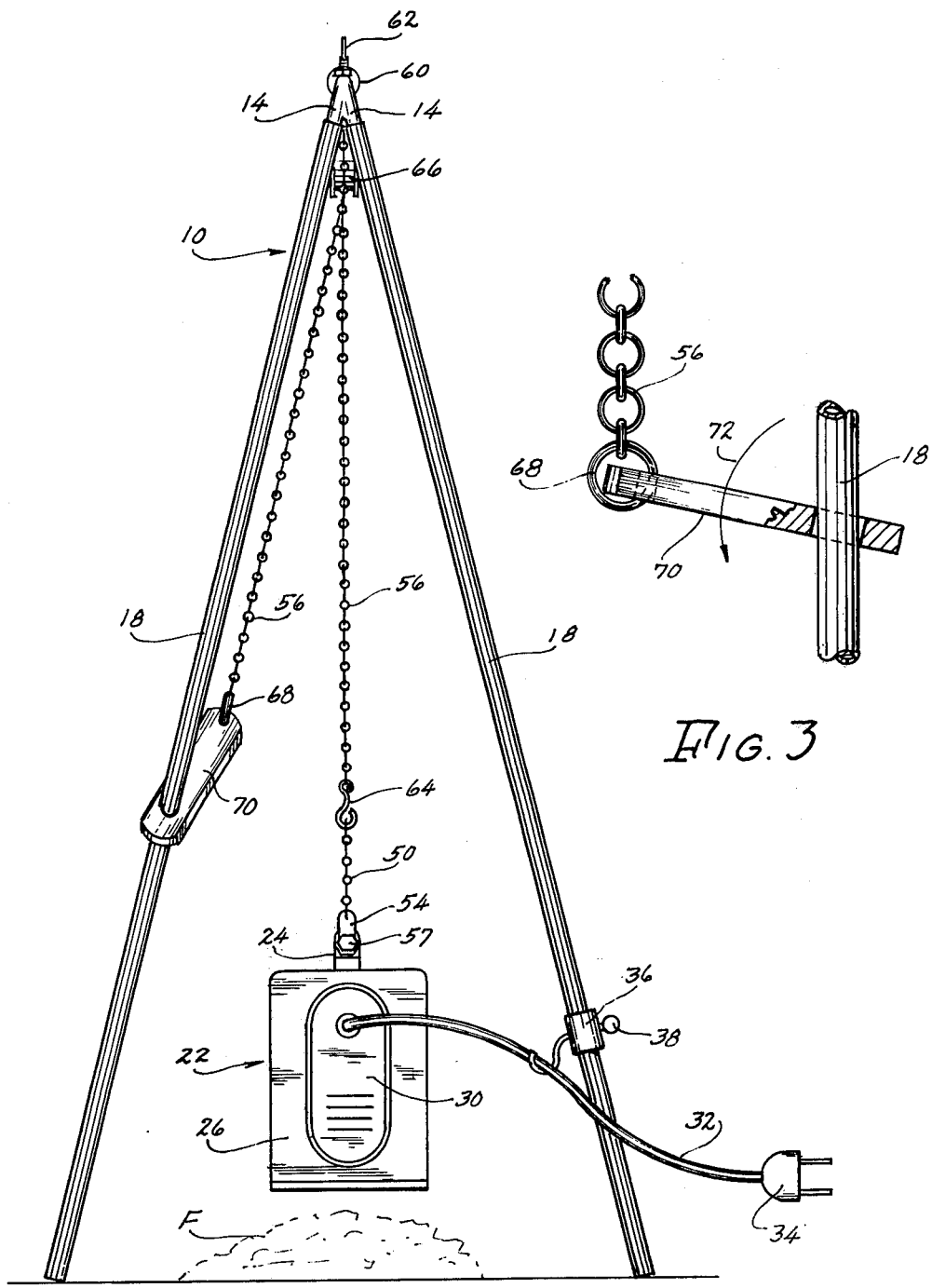
FIG. 2 is an end view of the frame with the rotisserie hanging therefrom.
FIG. 3 is an enlarged fragmentary view of the means of adjusting the height of the rotisserie relative to the fire.

When rotisserie 22 is in suspension as shown in FIGS. 1 and 2, height-adjusting arm 70 assumes an angular position relative to leg 18, as shown in detail in FIG. 3; then secured against axial movement relative to leg 18. When it is desired to adjust the vertical position of the rotisserie 22, the arm 70 is grasped by the hand and urged in the direction of arrow 72 of FIG. 3, thus permitting axial shifting of the arm 70. Release of the arm 70 permits the rotisserie 22 to be positioned at the desired height.

There may be instances when a fowl or other piece of meat to be roasted is mounted between the forks 46 and 48 and causes the rotisserie unit to tilt at an undesired angle, that would result in uneven roasting. In that instance, hook 64 is transferred to another link in chain 50, as shown in dotted lines, until a more level position is obtained. It is possible after this has been done, that the rotisserie will assume a position not central with respect to the frame 10 or the fire F. In order to readjust the position of the rotisserie, anchor member 60 is shifted axially along bar 12 to the desired position; for example, see the location as shown in dotted lines in FIG. 1. If the height of the rotisserie, after this adjustment is made is not satisfactory, further adjustment is obtained by shifting the arm 70 upwardly or downwardly as required.

The above being a complete description of an illustrative embodiment of the invention, what is claimed as new and desired to be secured by Letters Patent of the United States is:

1. A means of supporting a rotisserie over a fire, said rotisserie having a beam, said means comprising a horizontal bar supported on downwardly-extending legs, a bail extending longitudinally relative to said beam and having spaced links, one end of said bail secured adjacent to each extremity of said beam, an upwardly-directed flexible member selectively engaged to one of said links, a first rotating member slidably secured to said bar, said flexible member being trained over said first rotating member, a second rotating member spaced from said first rotating member and secured to said bar, said flexible member being trained over said second rotating member and directed downwardly, a height-adjusting arm axially adjustable on one of said legs, and said downwardly-directed flexible member being secured to said arm.

2. A means of supporting a rotisserie over a fire as set forth in claim 1 in which said bar terminates at each end thereof in a plurality of downwardly-directed diverging stub portions, and said legs being tubular and slidably positioned on said stub portions.

* * * * *